Sept. 25, 1956     I. E. SPEER     2,763,985
FUEL CONTROL FOR TURBINE DRIVEN COMPRESSOR UNIT
Filed Feb. 8, 1951     3 Sheets-Sheet 1
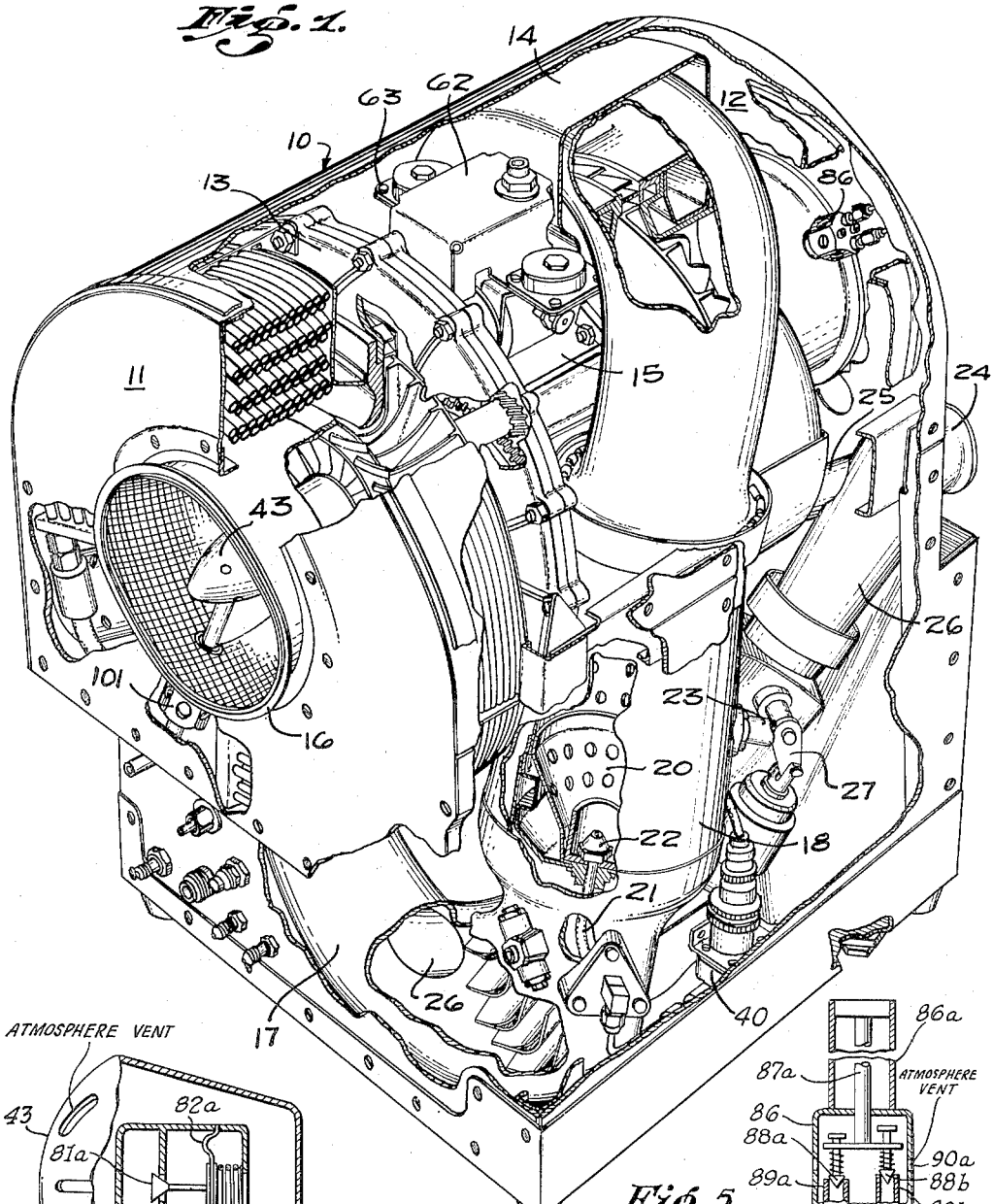
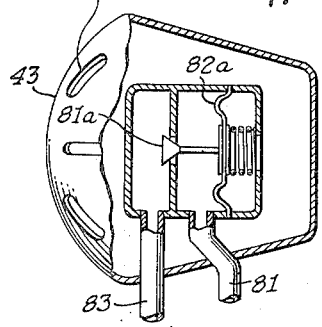
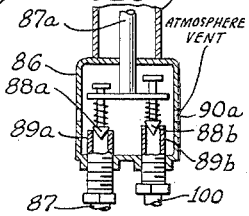
INVENTOR.
IVAN E. SPEER,
BY
ATTORNEY

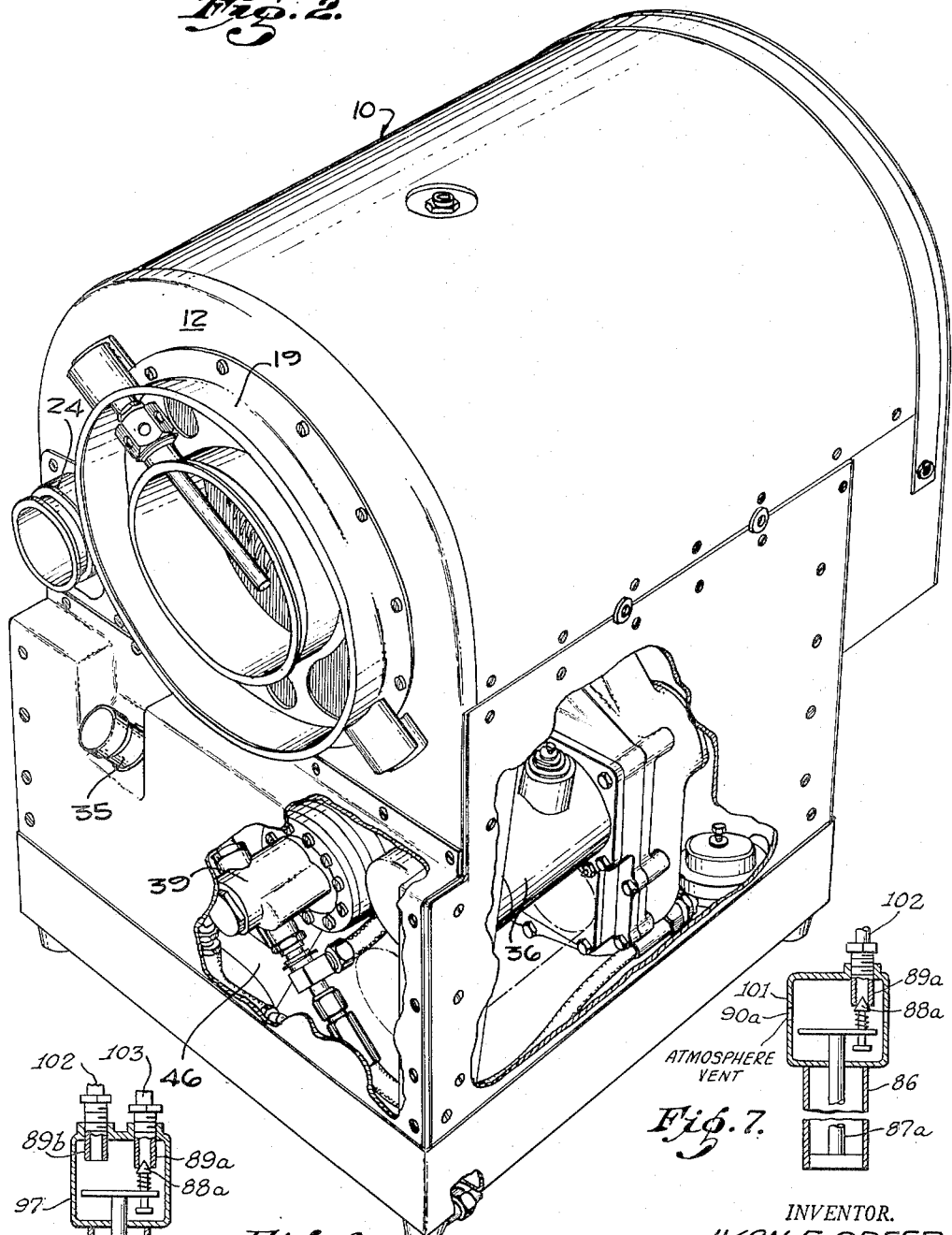

Sept. 25, 1956  I. E. SPEER  2,763,985
FUEL CONTROL FOR TURBINE DRIVEN COMPRESSOR UNIT
Filed Feb. 8, 1951  3 Sheets-Sheet 3

INVENTOR.
IVAN E. SPEER,
BY
ATTORNEY

United States Patent Office 2,763,985
Patented Sept. 25, 1956

2,763,985

FUEL CONTROL FOR TURBINE DRIVEN COMPRESSOR UNIT

Ivan E. Speer, Los Angeles, Calif., assignor to The Garrett Corporation, Los Angeles, Calif., a corporation of California Application February 8, 1951, Serial No. 209,929

3 Claims. (Cl. 60—39.07)

The present invention relates generally to apparatus for supplying a fluid such as air to a point of use for power and other purposes; and is more particularly concerned with a packaged unit which may be utilized in aircraft. In this connection, the apparatus is especially adapted for supplying air to pneumatic starters for turbo-jet and turbo-prop engines, as well as other types of engines utilized for the main propulsion power of aircraft.

One object of the herein described invention is to provide reliable apparatus for the required purpose, which is of low weight and bulk, and wherein the various components are assembled so as to form an easily installed and easily removable packaged power unit, containing the required essential auxiliaries and controls for its operation.

It is a further object to provide an airborne air supply unit which is especially adapted to furnish air to a pneumatic starter, and wherein a novel dual bleed system is utilized for controlling the temperature of supplied air over a wide range of ambient temperature conditions, thus permitting attainment of aerodynamically matched conditions between the air supply unit and engine starter without the use of waste energy controls.

A further object is to provide a packaged power unit in which a gas turbine is utilized for driving a compressor which furnishes the combustion air for the turbine, and in which distributed air for power purposes is bled from the compressor outlet and proportionally mixed with hot turbine gases bled from the turbine inlet in such amounts as to control the bleed air energy level according to a predetermined schedule.

Another object is to provide a novel governor control arrangement in connection with a fluid supply unit of the character described herein, which modulates a fuel supply valve and is operatively associated with acceleration and high turbine exhaust temperature controls which are so arranged as to modify the normal fuel valve operation.

Still another object is to provide in connection with such a unit novel means for unloading the unit during starting and idling periods, and for limiting the load which may be carried thereby so as to retain the operating characteristics within predetermined values.

It is also an object to provide novel automatic starting control for the fluid supply unit of the present invention, making use of novel electric switching means arranged to be energized from compressor outlet pressure, and having circuit controlling contacts which are sequentially operable at low pressure, high pressure, and very high pressure.

Briefly, the packaged power unit of the present invention comprises a hot gas turbine which is axially aligned with and closely coupled to a compressor, with an intermediate accessory housing, the entire assemblage being mounted in an enclosing casing. The outlet of the compressor is connected with a suitable combustion chamber leading to the turbine inlet, and an air supply duct connects with the turbine inlet and compressor outlet through bleed connections which permit the dual bleeding of compressor air and hot turbine gases which by suitable apportioning control permit the delivery of the mixed fluid to the point of use at a desired energy level determined by the differential temperature between the ambient inlet air to the compressor and the temperature in the delivery duct.

The operation of the unit is normally regulated by a suitable governor, in this case a pneumatic control governor which is responsive to variations in ratio of compressor inlet and outlet pressures, the normal regulation of the governor in the control of fuel supply being augmented by acceleration control means during starting of the unit, and by turbine exhaust temperature responsive means during operation of the unit. Unloading and load limiting controls are provided for regulating the supply of fluid delivered to the point of use, and consequently the operating characteristics of the unit. The electrical control is arranged for switch button start and stop from a remote control station, the control being timed in accordance with the starting acceleration of the unit through the use of a pressure responsive switching device having sequentially operable contacts arranged to function at low pressure, high pressure, and very high pressure. Safety controls are also provided for overspeed.

Further objects of invention will be brought out in the following part of the specification, wherein detailed description is for the purpose of fully disclosing the invention without placing limitations thereon.

Referring to the accompanying drawings, which are for illustrative purposes only:

Fig. 1 is an isometric view of a packaged power unit embodying the features of the present invention, looking at the compressor inlet end, portions of the casing and component parts being cut away to disclose structural parts thereof;

Fig. 2 is likewise an isometric view, looking at the turbine exhaust end, portions of the casing being cut away to disclose interior parts of the unit;

Fig. 4 is a view diagrammatically illustrating a pneumatic governor as utilized in connection with the controls, described herein; and Figs. 5, 6 and 7, respectively diagrammatically illustrate thermally controlled valves as utilized in the present invention.

The packaged unit in general

Figure 3:
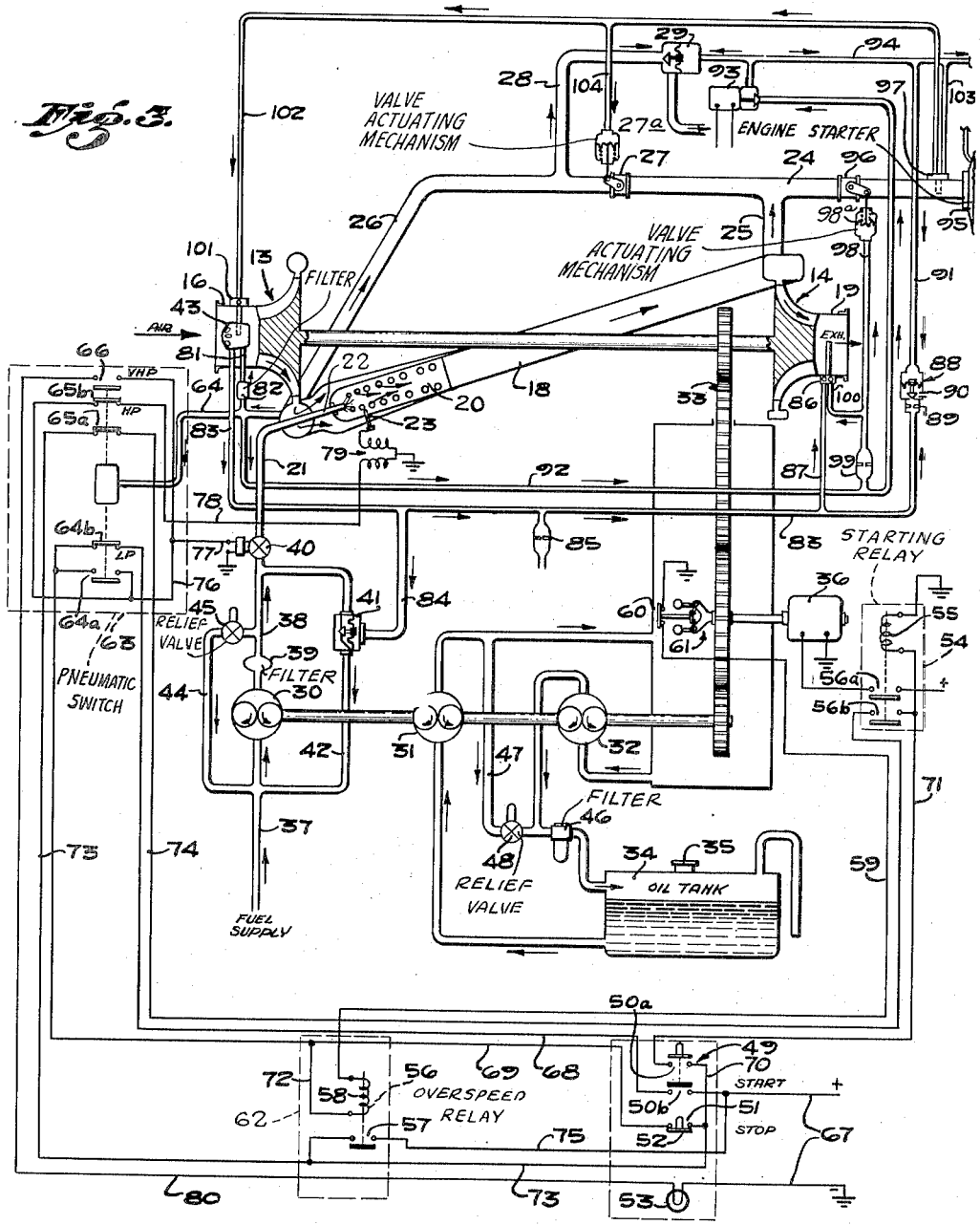
Fig. 3 is a view schematically representing the component parts of the unit, together with the controls therefor.

Referring generally to Figures 1 and 2 of the drawings, the packaged power unit of the present invention is illustrated as having its component parts compactly assembled within an enclosing casing as generally indicated at 10 which terminates in end walls 11 and 12 respectively and in which the necessary connections are mounted to permit the unit to be quickly and easily installed or removed.

Within the casing, an air compressor 13 is interconnected with an axially aligned hot gas turbine 14, a housing 15 for associated accessories being interposed between the compressor and turbine.

Inlet air to the compressor is through a tubular inlet 16 which is mounted in the end wall 11 of the casing. Outlet compressed air is conducted from the compressor through an outlet connection 17 to the inlet of a combustion chamber 18 of the straight through type, the outlet end of this combustion chamber connecting with the turbine inlet. Exhaust from the turbine is through an outlet 19 mounted in the end wall 12 of the casing.

Combustion air in the combustion chamber is admitted through a perforated flame tube 20 and mixed with a suitable fuel conducted into the combustion chamber through a supply conduit 21 and fixed area fuel nozzle 22. The fuel mixture is initially ignited by means of a suitable spark plug which may be disconnected once the unit has been properly started.

A distribution duct 24, for supplying compressed air to a point of use, is brought out through a tubular connection in the end wall 12 of the casing. The compressed air supplied through the duct 24 is a mixture of bleed air taken from the compressor and combustion chamber discharges. The hot gases are supplied through a bleed connection 25 of fixed area, while the relatively cooler air from the compressor is supplied through a bleed connection 26, so that a by-pass in effect is formed around the combustion chamber 18. The temperature of air delivered to the distribution duct 24 is controlled by means of a modulating valve 27 which is mounted in the bleed connection 26. The actuating mechanism 27a of this valve is pneumatically controlled, air pressure acting to open the valve and a spring acting to bias the valve towards closed position. Between the modulating valve 27 and the inlet end of bleed connection 26, the bleed connection is provided with a branch conduit 28 which is connected with atmosphere and controlled by means of an unloading valve 29 arranged to be opened by the air pressure in the conduit 28, and actuated to closed position by the application of air pressure in its control mechanism.

Within the auxiliary housing 15, provision is made for mechanically driving a fuel pump 30, oil pump 31 and scavenger oil pump 32 through suitable transmission gearing 33 by the turbine of the unit, oil being supplied through a closed system from an oil tank 34 having an exteriorly accessible filler connection 35 at the turbine exhaust end of the casing 10. The unit is arranged to be initially started and brought up to operating speed by means of a starting motor 36 forming a part of the electrical starting and control system which will hereinafter be described in detail.

*Fuel and oil systems*

As schematically illustrated in Fig. 3, the fuel system is a simple single flow line in which a supply conduit 37 connects with the inlet of the fuel pump 30, and an outlet connection 38 connects with the fuel supply conduit 21 of the combustion chamber. A filter 39 in the fuel pump discharge connection protects the fuel system of the unit, and a solenoid actuated shut-off valve 40, controlled as a part of the electric starting and control system to be hereinafter described, controls the fuel flow when starting and stopping the unit.

Fuel metering and control is accomplished by a by-pass valve 41 in a by-pass connection 42 around the pump. The by-pass valve is arranged to be opened by fuel pressure from the discharge side of the fuel pump, and closed by air pressure under the control of a pneumatic governor 43 which is mounted in the air intake to the compressor 13. As a safety measure, the fuel system is protected against abnormally high pressure by providing a pump by-pass connection 44 which is independently controlled by a relief valve 45. By-pass fuel in either by-pass 42 and by-pass 44 will be returned to the pump inlet.

The oil system is a positive pressure circulating oil system in which the oil supply is contained within the oil tank 34. Oil is pumper by the oil pump 31 from the oil tank and delivered under pressure to the unit, and is returned to the tank by means of the scavenger oil pump 32, an oil filter 46 being placed in the return line. As a safety measure, a connection 47 is provided between the discharge side of oil pump 31 and the return oil line from the scavenger oil pump 32, this connection being normally closed by means of a relief valve 48.

*Electrical starting and control system*

Provision is made for carrying out the automatic starting and ignition, and the various steps are properly co-ordinated and sequentially effected upon the closing of a starting switch 49 having normally open contacts 50a and 50b. This switch as well as a stop switch 51 having normally closed contacts 52 may be mounted at a remote station such as the pilot's or flight engineer's station and may also include indicating lamps, as illustrated at 53, as necessary.

The starting motor 36 is controlled through a starting relay 54 having an actuating coil 55 and normally open contacts 56a and 56b. An interlocking and overspeed relay 56 contains normally open contacts 57 and an actuating coil 58, one side of this coil being connected by a conductor 59 through normally closed contacts 60 of an overspeed switch 61. The relay 56 may be housed within a control box 62, as shown in Fig. 1, supported upon the intermediate auxiliary housing 15. Positioned adjacent the control box 62 is a pneumatically operated switch 63 which is connected through a conduit 64 to the compressor outlet so as to sense the compressor outlet pressure. This switch is arranged so as to sequentially close low pressure contacts, high pressure contacts, and very high pressure contacts. The low pressure contacts comprise normally open contacts 64a and normally closed contacts 64b. The high pressure contacts comprise normally closed contacts 65a and 65b, whereas the very high pressure comprises normally open contacts 66.

The operation of the electrical starting and control system will now be described. A suitable source of electric control current is provided, and may be from a suitable battery or generator, the source in the present instance being indicated by the numeral 67 with one side grounded.

In order to start the unit, it is only necessary to depress the starting switch 49 so as to close its contacts. The starting motor 36 will now be energized by activation of the starting relay 54 through the following circuit: from one side of the electrical source 67 through contacts 50b, conductor 68, closed contacts 64b, conductor 69, contacts 52 of the stop switch, through conductor 70, contacts 50a, through conductor 71 to one side of coil 55, and from the other side of this coil to ground. Energization of relay 54 causes it to close its contacts 56a and 56b. Closing of contacts 56a connects the starting motor 36 directly to the electrical source.

The relay 56, having one side of its actuating coil 58 connected through conductor 72 with the energized conductor 69, will be energized, since the other side of its coil is connected through conductor 59 and contact 60 of the overspeed switch to ground or the other side of the circuit. Relay 56 now closes its contacts 57 which enables release of the starting switch by establishing a holding circuit on the starting relay as follows: from one side of the electrical circuit 67 through contacts 57, conductor 73, the closed contact 65a of the pneumatic switch, conductor 74, contacts 56b, and thence by conductor 71 through the coil 55 and to the other side of the electrical circuit.

The starting motor 36 will now continue to accelerate the unit, and when the rotating speed becomes sufficiently high to produce the necessary pressure in the combustion chamber for ignition, the low pressure contacts of the pneumatic switch 63 will be actuated from their normal positions so as to close contacts 64a and open contacts 64b, whereby to energize the solenoid shut-off valve 40 to supply fuel to the combustion chamber, and energize the spark plug 23 for igniting this fuel. The solenoid shut-off valve is energized through the following circuit: from the high side of the electrical source 67, through conductor 75, contacts 57, conductor 73, contacts 52, conductor 69, the now closed contacts 64a, conductor 76 and conductor 77 to one side of the solenoid valve 40, and from the other side of this valve to the grounded side of the electrical source. The spark plug is energized through a branch connection of conductor 76 which passes through normally closed contacts 65b of the pneumatic switch 63, thence through conductor 78 to an ignition coil 79 having a grounded connection.

After the unit has accelerated to sufficient speed to support itself, the pneumatic switch 63 opens its high pressure contacts 65a and 65b which open the holding circuit of the starting relay 54 to disconnect the starting motor, and disconnects the ignition coil 79 which energizes the spark plug. The unit then accelerates to an operating condition at which the governor control takes over, as will hereinafter be explained in detail.

In the event that the compressor outlet pressure should reach a predetermined value of very high pressure, provision is made for indicating this condition to the remote control station. Such pressure will cause the pneumatic switch 63 to close its contacts 66 which will connect a branch of conductor 76 to conductor 80 which is connected to one side of signal lamp 53, the other side of this lamp being carried to the grounded side of an electrical source.

During normal operation, it will be observed that the energizing circuit of the solenoid shut-off valve 40 is through the contacts 57 of relay 56. Should an overspeed occur, which will open contacts 60, the energizing circuit to the coil 58 will be interrupted and permit this relay to open its contacts and enable closure of shut-off valve 40 to stop the unit. The unit may also be stopped by actuation of stop switch 51 which will open its contacts and also interrupt the energizing circuit of the coil 58 of relay 56, whereupon the relay will open its contacts to shut down the unit in the same manner as just explained.

*Pneumatic control system*

In its broad concept, the present invention contemplates that various types of governors may be utilized for normally controlling the unit of the present invention, such as a mechanical inertia type of governor, a hydraulically actuated governor and pneumatically controlled governor. For purposes of illustration and discussion, a pneumatic governor is utilized in connection with the pneumatic control system. This governor, as will be noted in Figure 3, is mounted at the inlet of the compressor 13 and is connected through a conduit 81 and filter 82 with conduit 64 which senses the compressor outlet pressure. This governor, as diagrammatically shown in Fig. 4, is arranged to modulate the supply of air pressure to conduit 83, the conduit 83 being connected through a branch connection 84 with the air pressure side of the by-pass valve 41 control. Air flow from conduit 81 to conduit 83 is controlled by a valve 81a operatively connected to a movable wall or diaphragm 82a subject on one side to compressor outlet pressure and on the other side to compressor inlet or atmospheric pressure, so that fuel supply will be varied directly in response to variations in the compressor inlet pressure. For example, if the compressor inlet air pressure decreases, the fuel supply will likewise be decreased. The governor 43 is thus basically arranged to control the unit to a constant compressor pressure ratio over the load range thereon. Thus, by varying the air pressure acting on the by-pass valve 41, the fuel supply is properly controlled to the combustion chamber.

A metering orifice 85 connects the conduit 83 with atmosphere, and thus determines the pressure therein.

Provision is made for modifying the normal governor control upon the occurrence of predetermined overtemperature in the turbine exhaust. For such purpose, there is provided a pressure vent valve 86 having a temperature sensing control element. This valve is connected by branch conduit 87 with conduit 83 so that at high temperature, the pressure in line 83 will be reduced so as to permit greater by-pass of fuel through by-pass valve 41, whereupon the fuel furnished the combustion chamber will be reduced and the exhaust gas temperature lowered. As diagrammatically shown in Fig. 5, the vent valve 86 briefly comprises a housing having a tubular portion 86a within which there is mounted a rod 87a, these parts coacting to provide temperature responsive means in a manner well known in the art. Spring mounted valves 88a and 88b, carried by the rod are operatively associated with valve seats 89a and 89b connected respectively with conduits 87 and 100. The arrangement is such that as the temperature of the tubular portion and rod increases, the valves will be moved towards opening position. The valve housing is vented to atmosphere at 90a.

It will be appreciated that there will be some time lag in the operation of the vent valve 86. During starting of the unit, prior to the time when the governor control takes over, the fuel pump tends to furnish a greater amount of fuel than required. In order to reduce the fuel supply during acceleration of the unit, an acceleration control valve is provided for normally bleeding air from conduit 83 through a restricted orifice 89 and atmospheric vent 90, which reduces the pressure acting on the valve 41 and permits by-pass of fuel and thus reduction of fuel supply to the combustion chamber. The acceleration control valve is arranged to be closed by air pressure which is supplied through a conduit 91. During normal starting operation, there is no pressure acting to close the acceleration valve, nor while the unit is idling.

Pneumatic control air under pressure is also supplied from the compressor outlet through a conduit 92 through a normally closed solenoid operated cut-off valve 93 to a distribution control pressure conduit 94 which may lead to a remote pneumatic control station, in this instance a control station for an engine starter 95 connected to receive operating air from the distribution conduit 24. The cut-off valve 93 may therefore be utilized to initiate supply of air to a remote point of use, and as a consequence the loading of the unit. The conduit 94, it will be observed, is connected to the pressure closing side of the unloading valve 29, so that upon initiating control which will result in loading of the unit, the unloading valve will be closed to shut off flow through the conduit 28. Since the conduit 91 is also connected to distribution conduit 94, the placing of pressure on conduit 94 will also result in closing the acceleration control valve 88.

A loading limiting valve 96 is mounted in the distribution duct 24. In practice, this valve as well as a thermally controlled valve 97 are preferably connected to the end of the duct 24, which is shown in Figure 2 as projecting from the casing end wall 12, in order to prevent time lag in operation. The valve 96 is operated by an actuating mechanism 98a which is spring operated in a valve closing direction and by pressure from a conduit 98 in a valve opening direction, the conduit 98 being connected to conduit 92 through a metering orifice 99 which limits the pressure supply from the conduit 92 and permits actuation of the load limiting valve by bleeding off air from conduit 98 through connection conduit 100 at a predetermined temperature setting of pressure vent valve 86.

Since the power available from expansion of compressed air supplied from the unit varies directly as the temperature of the source, it is contemplated in the present invention to control the temperature according to a predetermined schedule. The bleed air temperature furnished through the duct 24 is controlled to a constant increase above ambient by mixing combustion gases with the compressor discharge bleed air. The mixing of bleed air and hot gases is accomplished through the operation of the modulating valve 27 which is operatively arranged to be spring closed and pneumatically opened. Pressure for actuating the valve 27 is controlled through a thermally controlled valve 101 located in the compressor inlet at the end of a conduit 102, this valve being arranged to vent the conduit to atmosphere in response to temperature changes in ambient air entering the compressor. Operating air pressure is normally supplied to the conduit 102 from conduit 94 which is connected through conduit 103 and the thermally controlled valve 97 to the conduit 102. A branch conduit 104 connects with the actuating mechanism of valve 27. The valves 97 and 101 are both arranged to open when the associated temperature increases and are in general of similar construction to that of valve 86 previously described. As diagrammatically shown in Fig. 6, the valve 97 is in this case not vented to atmosphere and contains only the valve 88a, the seat 89a in this case being connected to conduit 103, while the seat 89b is in this case connected to conduit 102. On the other hand, valve 101, as shown in Fig. 7, is vented to atmosphere and the valve seat 89a is in this case connected to conduit 102, the valve seat 89b and its conduit connection being eliminated. With the arrangement just described, it will be apparent that if the temperature at the valve 97 increases too high, this valve opens and increases the pressure acting in the conduit 104, thus actuating valve 27 toward open position so as to supply a greater amount of compressor outlet air through the bleed connection 26 for restoring the temperature to normal. A decrease in temperature at the valve 97 acts conversely to close the valve 27 and cause the temperature to be increased toward normal condition.

At the intake of the compressor, the valve 101, upon increased ambient temperature, will open so as to vent the conduit 102 and thus decrease the pressure acting upon the operating mechanism of valve 27, thus enabling this valve to move towards closed position under its spring action. This will decrease the flow of relatively cooler air through the bleed connection 26 and enable the hot turbine gases from bleed connection 25 to raise the temperature at valve 97 so as to restore the proper pressure differential between the temperature at valve 97 and the ambient air temperature at valve 101. With a decrease of ambient temperature at valve 101, the operation will be just the opposite.

It will therefore be apparent that by controlling the modulating valve 27 in the manner described above, a scheduled temperature differential may be maintained between the temperature of delivered air through the duct 24 and the temperature of ambient air entering the compressor 13. In the case of the utilization of the herein described unit to supply operating air pressure to an engine starting turbine 95, this arrangement permits aerodynamically matched operation of the turbine compressor unit and the air starter through a wide range of ambient temperatures without the use of waste energy controls.

It will also be appreciated that a power packaged unit of the herein described construction may be utilized to selectively furnish through proper selective valves operative air pressure to a plurality of starting turbines.

It is appreciated that various modifications may suggest themselves to those skilled in the art without departing from the spirit of the present invention, and, hence, it is desired that the invention shall not be restricted to the specific form shown or uses mentioned, except to the extent indicated in the appended claims.

I claim:

1. Air supply apparatus, comprising: a hot gas turbine having a combustion chamber; a compressor driven by said turbine for supplying combustion air to said chamber; an air bleed-off duct; a fuel pump driven by said turbine for supplying fuel to said combustion chamber; a fluid pressure closed valve controlling a by-pass around said fuel pump; control means for said valve including a connection from the outlet side of said compressor to said valve for supplying actuating fluid pressure thereto; a metering orifice venting said connection to atmosphere during starting acceleration of the turbine; means for inactivating said orifice during load conditions; and a valve for bleeding said connection in response to a high temperature turbine exhaust.

2. Air supply apparatus, comprising: a hot gas turbine having a combustion chamber; a compressor driven by said turbine for supplying combustion air to said chamber; an air bleed-off duct; a fuel pump driven by said turbine for supplying fuel to said combustion chamber; a fluid pressure controlled valve in a by-pass around said fuel pump; means for varying the fluid pressure applied to said valve in response to speed changes; and a valve controlled atmospheric vent for modifying the fluid pressure applied to said by-pass valve, said valve being operable to inactivate the vent under load operating conditions.

3. Air supply apparatus, comprising: a hot gas turbine; means for supplying a hot gas to said turbine including a compressor; a distribution duct having connections for bleeding air from said compressor; a normally closed modulating valve in the compressor bleed connection; and an unloading valve connected between said modulating valve and said compressor for connecting the compressor bleed connection with atmosphere during starting and no load conditions, and disconnecting such bleed connection from atmosphere under load conditions.

References Cited in the file of this patent

UNITED STATES PATENTS

| | | |
|---|---|---|
| 1,663,214 | Muller | Mar. 20, 1928 |
| 1,826,040 | Beimling et al. | Oct. 6, 1931 |
| 2,115,888 | Staley | May 3, 1938 |
| 2,115,921 | Steiner | May 3, 1938 |
| 2,131,781 | Lysholm | Oct. 4, 1938 |
| 2,147,935 | Steiner | Feb. 21, 1939 |
| 2,162,967 | Pescara | June 20, 1939 |
| 2,186,706 | Martinka | Jan. 9, 1940 |
| 2,275,543 | Meyer | Mar. 10, 1942 |
| 2,325,619 | Lysholm | Aug. 3, 1943 |
| 2,466,282 | Sparrow et al. | Apr. 5, 1946 |
| 2,547,660 | Prince | Apr. 3, 1951 |
| 2,668,416 | Lee | Feb. 9, 1954 |
| 2,669,094 | Lee | Feb. 16, 1954 |